United States Patent
Tsuji et al.

(10) Patent No.: US 11,220,270 B2
(45) Date of Patent: Jan. 11, 2022

(54) CONTROL SYSTEM OF VEHICLE, CONTROL METHOD OF THE SAME, AND NON-TRANSITORY COMPUTER-READABLE STORAGE MEDIUM

(71) Applicant: HONDA MOTOR CO., LTD., Tokyo (JP)

(72) Inventors: Kanta Tsuji, Wako (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 16/750,222

(22) Filed: Jan. 23, 2020

(65) Prior Publication Data

US 2020/0269857 A1 Aug. 27, 2020

(30) Foreign Application Priority Data

Feb. 27, 2019 (JP) .............................. JP2019-034677

(51) Int. Cl.
*B60W 40/08* (2012.01)
*B60W 50/00* (2006.01)

(52) U.S. Cl.
CPC ........ *B60W 50/0098* (2013.01); *B60W 40/08* (2013.01); *B60W 2040/0881* (2013.01);
(Continued)

(58) Field of Classification Search
CPC ............. B60W 50/0098; B60W 40/08; B60W 2040/0881; B60W 2540/049; B60W 2720/106; B60W 2520/10; B60W 2520/105; B60W 2540/221; B60W 2710/20; B60W 2554/802; B60W 2540/047; B60W 30/182; B60W 30/18163
See application file for complete search history.

(56) References Cited

U.S. PATENT DOCUMENTS 10,858,011 B1 * 12/2020 Christensen ........... B60K 28/08
2018/0215392 A1 8/2018 Kosaka et al.
(Continued)

FOREIGN PATENT DOCUMENTS

JP 2018-062197 A 4/2018
JP 2018-90025 A 6/2018
(Continued)

OTHER PUBLICATIONS

English_Translation_JPWO2018221350A1 (Year: 2018).*
(Continued)

*Primary Examiner* — Peter D Nolan
*Assistant Examiner* — Ashley L Redhead, Jr.
(74) *Attorney, Agent, or Firm* — Westerman, Hattori, Daniels & Adrian, LLP (57) ABSTRACT

A control system of a vehicle that can travel by a plurality of travel modes which have different control operations from each other at the time of driving support control, comprises: a detection unit that detects an occupant or a plurality of occupants of the vehicle; a decision unit that decides, among the plurality of travel modes, a travel mode corresponding to an attribute of the occupant and/or a combination of occupants detected by the detection unit; and a control unit that controls travel of the vehicle by the travel mode decided by the decision unit.

10 Claims, 5 Drawing Sheets

(52) U.S. Cl.
CPC ... *B60W 2520/10* (2013.01); *B60W 2520/105* (2013.01); *B60W 2540/049* (2020.02); *B60W 2540/221* (2020.02); *B60W 2554/802* (2020.02); *B60W 2710/20* (2013.01); *B60W 2720/106* (2013.01)

(56) References Cited

U.S. PATENT DOCUMENTS

| | | | |
|---|---|---|---|
| 2019/0009788 A1* | 1/2019 | Phillips | B60R 16/037 |
| 2019/0135284 A1* | 5/2019 | Tokita | B60W 30/182 |
| 2020/0118280 A1 | 4/2020 | Inata et al. | |

FOREIGN PATENT DOCUMENTS

| | | | | |
|---|---|---|---|---|
| JP | 2018-097737 A | | 6/2018 | |
| JP | 2018-124860 A | | 8/2018 | |
| JP | 2019-012413 A | | 1/2019 | |
| JP | 2019189064 A | * | 10/2019 | |
| JP | WO2018221350 A1 | * | 12/2019 | G08G 1/16 |
| KR | 20050002117 A | * | 1/2005 | |

OTHER PUBLICATIONS

English_Translation_JP2019189064A (Year: 2018).*
English_Translation_KR20050002117A (Year: 2005).*
Office Action dated Nov. 6, 2020, issued in counterpart JP Application No. 2019-034677, with English translation (5 pages).

\* cited by examiner

| | FIRST TRAVEL MODE | SECOND TRAVEL MODE | THIRD TRAVEL MODE |
|---|---|---|---|
| LANE CHANGE OPERATION | ○ | ○ | × |
| CONSECUTIVE NUMBERS | NO LIMIT | UP TO ONCE | — |
| ROUTE GUIDANCE | ○ | ○ | ○ |
| ACCELERATION/ DECELERATION CONTROL | ○ | ○ | ○ |
| AMOUNT OF CHANGE | NO LIMIT | 5km/sec | 1km/sec |
| VEHICLE FOLLOWING DISTANCE CONTROL | ○ | ○ | ○ |
| DISTANCE LIMIT | NO LIMIT | EQUAL TO OR MORE THAN 10 m | EQUAL TO OR MORE THAN 20m |

FIG. 4

| DETECTED STATE | CORRESPONDENCE TRAVEL MODE |
|---|---|
| ONLY DRIVER | FIRST TRAVEL MODE |
| INCLUDE CHILD | SECOND TRAVEL MODE |
| INCLUDE ELDERLY PERSON | SECOND TRAVEL MODE |
| INCLUDE INFANT/TODDLER | THIRD TRAVEL MODE |
| INCLUDE PREDETERMINED USER | THIRD TRAVEL MODE |
| NUMBER OF OCCUPANTS IS EQUAL TO OR MORE THAN PREDETERMINED NUMBER | SECOND TRAVEL MODE |
| STATE OF OCCUPANT IS A | THIRD TRAVEL MODE |
| STATE OF OCCUPANT IS B | SECOND TRAVEL MODE |
| DRIVER IS X | FIRST TRAVEL MODE |
| DRIVER IS Y | SECOND TRAVEL MODE |

FIG. 5

CONTROL SYSTEM OF VEHICLE, CONTROL METHOD OF THE SAME, AND NON-TRANSITORY COMPUTER-READABLE STORAGE MEDIUM

CROSS-REFERENCE TO RELATED APPLICATION(S)

This application claims priority to and the benefit of Japanese Patent Application No. 2019-034677 filed on Feb. 27, 2019, the entire disclosure of which is incorporated herein by reference.

BACKGROUND OF THE INVENTION

Field of the Invention

The present invention relates to a control system of a vehicle, a control method of the same, and a non-transitory computer-readable storage medium.

Description of the Related Art

In vehicle driving support control, there is known control for automatically executing various kinds of travel functions. The travel functions of the driving support control are for, for example, lane changing, automatic passing, controlling the distance from a preceding vehicle, and the like. For example, Japanese Patent Laid-Open No. 2018-90025 discloses that, when a lane change operation is to be performed under the driving support control, the lane change operation will be started upon creating a distance between the self-vehicle and the preceding vehicle based on the presence/absence of a driving sign.

In the driving support control of the related art, travel control is performed based on a travel state suited to a driver's preference. On the other hand, for example, in Japanese Patent Laid-Open No. 2018-90025, control or switching of the control state of the travel support is not performed based on information that includes not only the driver but also a passenger of the vehicle.

SUMMARY OF THE INVENTION

Hence, the present invention provides to execute and continue the process of driving support control which corresponds to the attribute of each occupant of the vehicle.

An embodiment according to the present invention provides a control system of a vehicle that can travel by a plurality of travel modes which have different control operations from each other at the time of driving support control, comprising: a detection unit configured to detect an occupant or a plurality of occupants of the vehicle; a decision unit configured to decide, among the plurality of travel modes, a travel mode corresponding to an attribute of the occupant and/or a combination of occupants detected by the detection unit; and a control unit configured to control travel of the vehicle by the travel mode decided by the decision unit.

Another embodiment according to the present invention provides a control system of a vehicle that can travel by a plurality of travel modes which have different control operations from each other at the time of driving support control, comprising: a detection unit configured to detect an occupant or a plurality of occupants of the vehicle; a decision unit configured to decide, among the plurality of travel modes, a travel mode corresponding to an attribute of the occupant detected by the detection unit; and a control unit configured to control travel of the vehicle by the travel mode decided by the decision unit, wherein in a case in which the detection unit has detected the plurality of occupants, the decision unit decides a travel mode corresponding to an attribute with a highest degree of priority among the attributes of the plurality of occupants.

Yet another embodiment according to the present invention provides a control method of a vehicle that can travel by a plurality of travel modes which have different control operations from each other at the time of driving support control, the method comprising: detecting an occupant or a plurality of occupants of the vehicle; deciding, among the plurality of travel modes, a travel mode corresponding to an attribute of the occupant and/or a combination of occupants detected in the detecting; controlling travel of the vehicle by the travel mode decided in the deciding.

Yet another embodiment according to the present invention provides a control method of a vehicle that can travel by a plurality of travel modes which have different control operations from each other at the time of driving support control, the method comprising: detecting an occupant or a plurality of occupants of the vehicle; deciding, among the plurality of travel modes, a travel mode corresponding to an attribute of the occupant detected in the detecting; and controlling travel of the vehicle by the travel mode decided in the deciding, wherein in a case in which the plurality of occupants is detected in the detecting, a travel mode corresponding to an attribute with a highest degree of priority among the attributes of the plurality of occupants is decided in the deciding.

Yet another embodiment according to the present invention provides a non-transitory computer-readable storage medium storing a program to cause a computer, which is incorporated in a vehicle that can travel by a plurality of travel modes which have different control operations from each other at the time of driving support control, to function as an obtainment unit configured to obtain information of an occupant or a plurality of occupants of the vehicle from a detection unit; a decision unit configured to decide, among the plurality of travel modes, a travel mode corresponding to an attribute of the occupant and/or a combination of occupants specified by the information obtained by the obtainment unit; and a control unit configured to control travel of the vehicle by the travel mode decided by the decision unit.

Yet another embodiment according to the present invention provides a non-transitory computer-readable storage medium storing a program to cause a computer, which is incorporated in a vehicle that can travel by a plurality of travel modes which have different control operations from each other at the time of driving support control, to function as an obtainment unit configured to obtain information of an occupant or a plurality of occupants of the vehicle from a detection unit; a decision unit configured to decide, among the plurality of travel modes, a travel mode corresponding to an attribute of the occupant specified by the information of the occupant obtained by the obtainment unit; and a control unit configured to control travel of the vehicle by the travel mode decided by the decision unit, wherein in a case in which the detection unit has detected the plurality of occupants, the decision unit decides a travel mode corresponding to an attribute with a highest degree of priority among the attributes of the plurality of occupants.

According to the present invention, driving support control corresponding to the attribute of each occupant of the vehicle can be executed.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

[Vehicle Arrangement]

Figure 1:
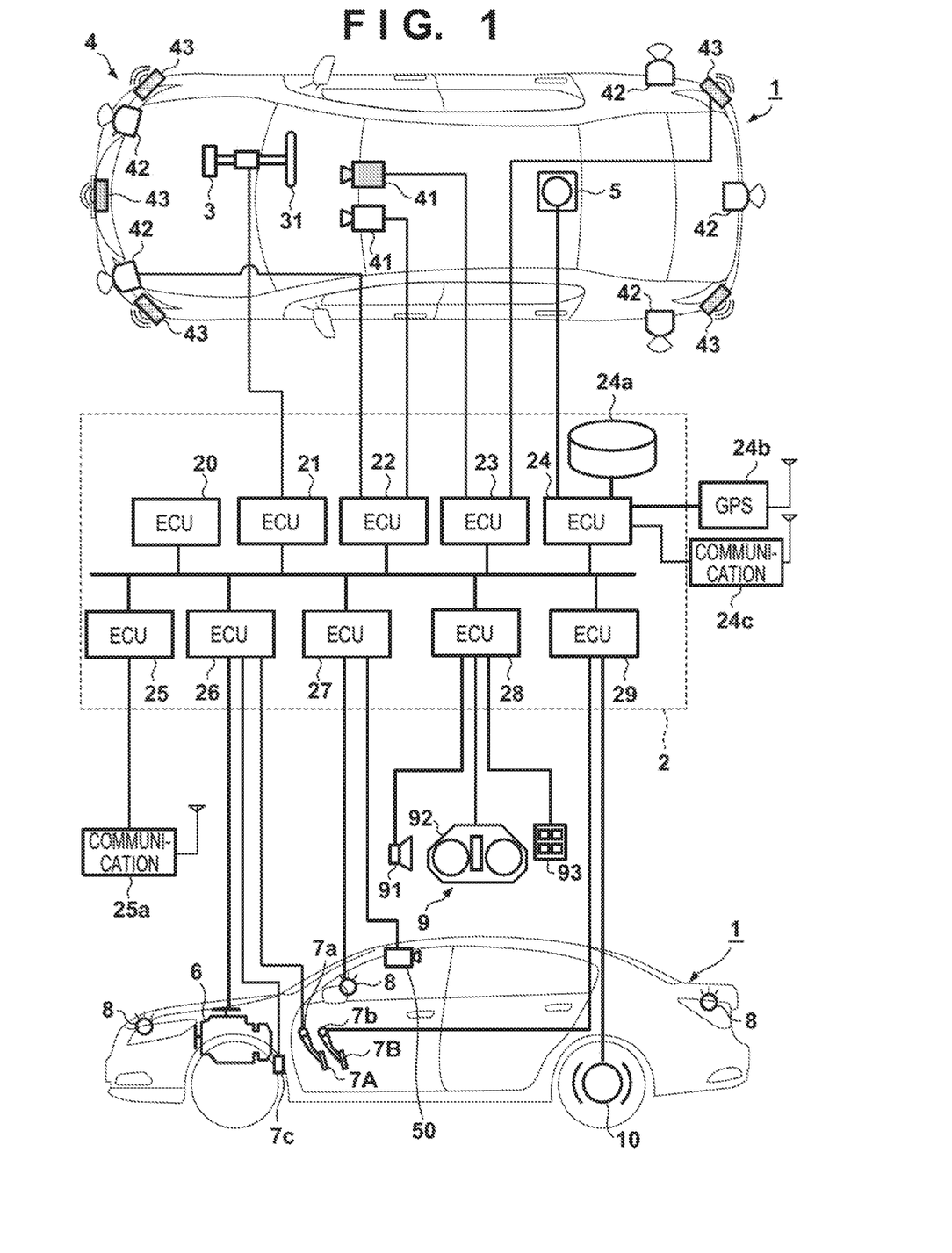
FIG. 1 is a block diagram according to a vehicle control apparatus according to an embodiment of the present invention.

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle.

The control apparatus shown in FIG. 1 includes a control system 2. The control system 2 includes a plurality of ECUs 20 to 29 communicably connected by an in-vehicle network. Each ECU (Electronic Control Unit) functions as a computer which includes a processor represented by a CPU (Central Processing Unit), a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed in the vehicle 1, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, both steering and acceleration/deceleration are automatically controlled.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the cameras 41 hereinafter) that captures the front side of the vehicle 1. In this embodiment, the cameras 41 are attached to the windshield inside the vehicle cabin at the roof front of the vehicle 1. When images captured by the cameras 41 are analyzed, the contour of a target or a division line (a white line or the like) of a lane on a road can be extracted.

Each detection unit 42 is Light Detection and Ranging (LIDAR) (to be sometimes referred to as the LIDARs 42 hereinafter), and detects a target around the vehicle 1 or measures the distance to a target. In this embodiment, five LIDARs 42 are provided; one at each corner of the front portion of the vehicle 1, one at the center of the rear portion, and one on each side of the rear portion. Each detection unit 43 is a millimeter wave radar (to be sometimes referred to as the radars 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LIDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LIDARs, and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

Examples of Control Functions

The control function of the vehicle 1 includes traveling-associated functions associated with control of driving, braking, and steering of the vehicle 1, and notification functions associated with a notification of information to the driver.

Examples of traveling-associated functions are lane maintenance control, lane departure suppression control (road departure suppression control), lane change control, preceding vehicle following control, collision reduction brake control, and erroneous start suppression control. Examples of the notification functions are adjacent vehicle notification control and preceding vehicle start notification control.

Lane maintenance control is one of control processes for the position of the vehicle with respect to a lane. This control makes the vehicle travel automatically (without depending on the driving operation of the driver) on the track of travel set in a lane. Lane departure suppression control is one of control processes for the position of the vehicle with respect to a lane. A white line or a median strip is detected, and steering is automatically performed so the vehicle does not pass across the line. As described above, lane departure suppression control and lane maintenance control are different functions.

Lane change control is control performed to automatically move the vehicle from the lane on which the vehicle is traveling to an adjacent lane. Preceding vehicle following control is control of automatically following another vehicle traveling ahead of the self-vehicle. Collision reduction brake control is control that supports collision avoidance by automatically braking the vehicle when the possibility of collision against an obstacle ahead of the vehicle rises. Erroneous start suppression control is control to limit acceleration of the vehicle in a vehicle stop state in a case in which the acceleration operation by the driver is a predetermined amount or more, and suppresses an abrupt start.

Adjacent vehicle notification control is control of notifying the driver of the presence of another vehicle traveling on the adjacent lane which is adjacent to the travel lane of the self-vehicle. The driver is notified of, for example, the presence of another vehicle traveling on a side or on a rear side of the self-vehicle. Preceding vehicle start notification control is control performed to notify the driver that another vehicle ahead has started when the self-vehicle and another vehicle ahead are in a stop state. These notifications can be made by the in-vehicle notification devices described above.

[In-Vehicle Detection]

The vehicle 1 further includes an in-vehicle detection unit 50 that detects the state inside the vehicle. The in-vehicle detection unit 50 is formed by a camera as an image capturing unit, a weight sensor, a temperature detection sensor, and the like, and the type of the in-vehicle detection unit to be used is not particularly limited. Note that the in-vehicle detection unit 50 may be arranged for each seat provided in the vehicle 1 or may be arranged to be a single component that can monitor and take a bird's eye view of the whole interior of the vehicle.

Assume also that the control system 2 can obtain various kinds of information detected by the in-vehicle detection unit 50 and determine the presence/absence of a driver and a passenger, the state and attribute of each occupant of the vehicle, and determine whether each occupant is a specific person. Furthermore, the control system 2 may hold a boarding history of the driver and the fellow passenger based on the detection result. Note that in this embodiment, each person riding the vehicle 1 such as the driver, a passenger, or the like will be summarized and referred to as an occupant.

[Travel Mode]

Figure 2:
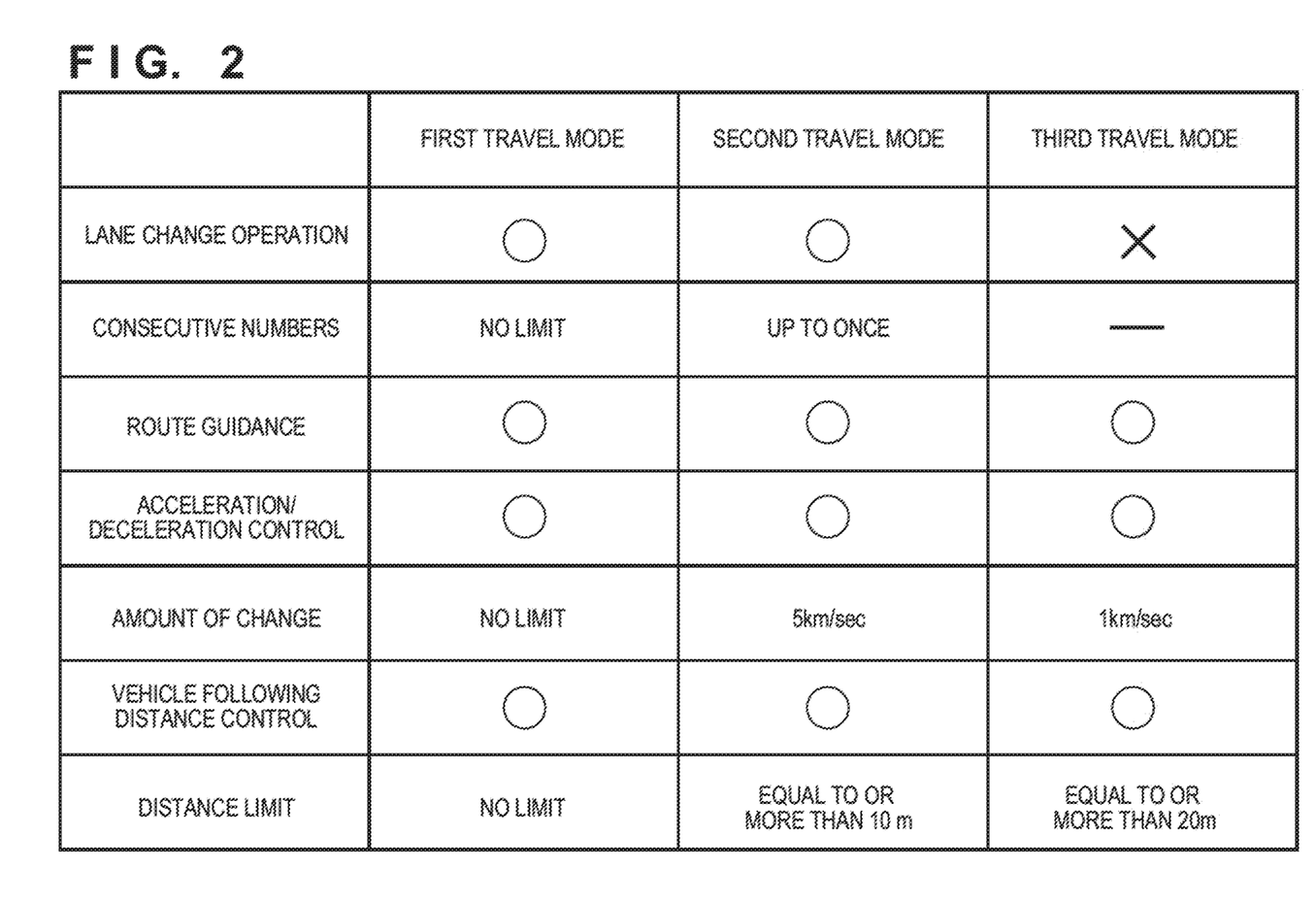
FIG. 2 is a table for explaining an example of driving support provided by each travel mode according to the embodiment of the present invention.

FIG. 2 is a table showing an example of travel modes at the time of travel support control according to this embodiment. Assume that the vehicle 1 according to this embodiment can travel by a plurality of travel modes when travel support is to be performed. This embodiment will describe an example of three travel modes (a first travel mode to a third travel mode) that can be changed in accordance with the occupant of the vehicle 1. Also, in addition to these travel modes, a default travel mode which is a travel mode that is set by default regardless of the occupant will be described.

Each travel mode has different providable functions. Although the functions in this case will be exemplified by the travel associated functions described above, other travel associated functions and other control functions may also be associated with these travel modes. In addition, control is not limited to controlling the ON/OFF setting of each function for each travel mode, and control that changes a threshold or the like used in each function for each travel mode may be performed. For example, the travel position in a lane may be specified for each travel mode or a specification that recommends the driver to travel on the left lane among the plurality of lanes may be set.

In FIG. 2, the lane change operation is enabled in the first travel mode and the second travel mode. On the other hand, the lane change operation is disabled in the third travel mode. Also, although route guidance control, acceleration/deceleration control, and vehicle following distance control (adaptive cruise control) can be performed in each of the travel modes, assume that the thresholds (the count and the upper limit and the lower limit of control) used in the respective control processes will differ. The thresholds shown here are merely examples and are not limited to these. In addition, a plurality of thresholds may be used to perform control in one function, and each function may be set with a plurality of thresholds for each travel mode.

In this embodiment, the relationship of the travel modes shown in FIG. 2 can be expressed as the third travel mode>the second travel mode>the first travel mode, and it will be described that safer travel support control is performed based on this relationship. Note that the control related to safety may be high for each of the default travel mode and the first travel mode. Although methods such as increasing the following distance from the preceding vehicle, setting the acceleration/deceleration rate of the travel speed to be less than a predetermined ratio, and the like can be raised as an example of high safety level travel support control operations in this case, the methods can be adjusted in, accordance with each function and the like. In addition, a control threshold that has been optimized for each occupant with a specific attribute (for example, an elderly person or a child) may be used. Assume that the pieces of control information corresponding to the travel modes shown in FIG. 2 are stored in a storage unit in the vehicle 1 in advance and are read out as needed.

[Processing Procedure]

Figure 3:
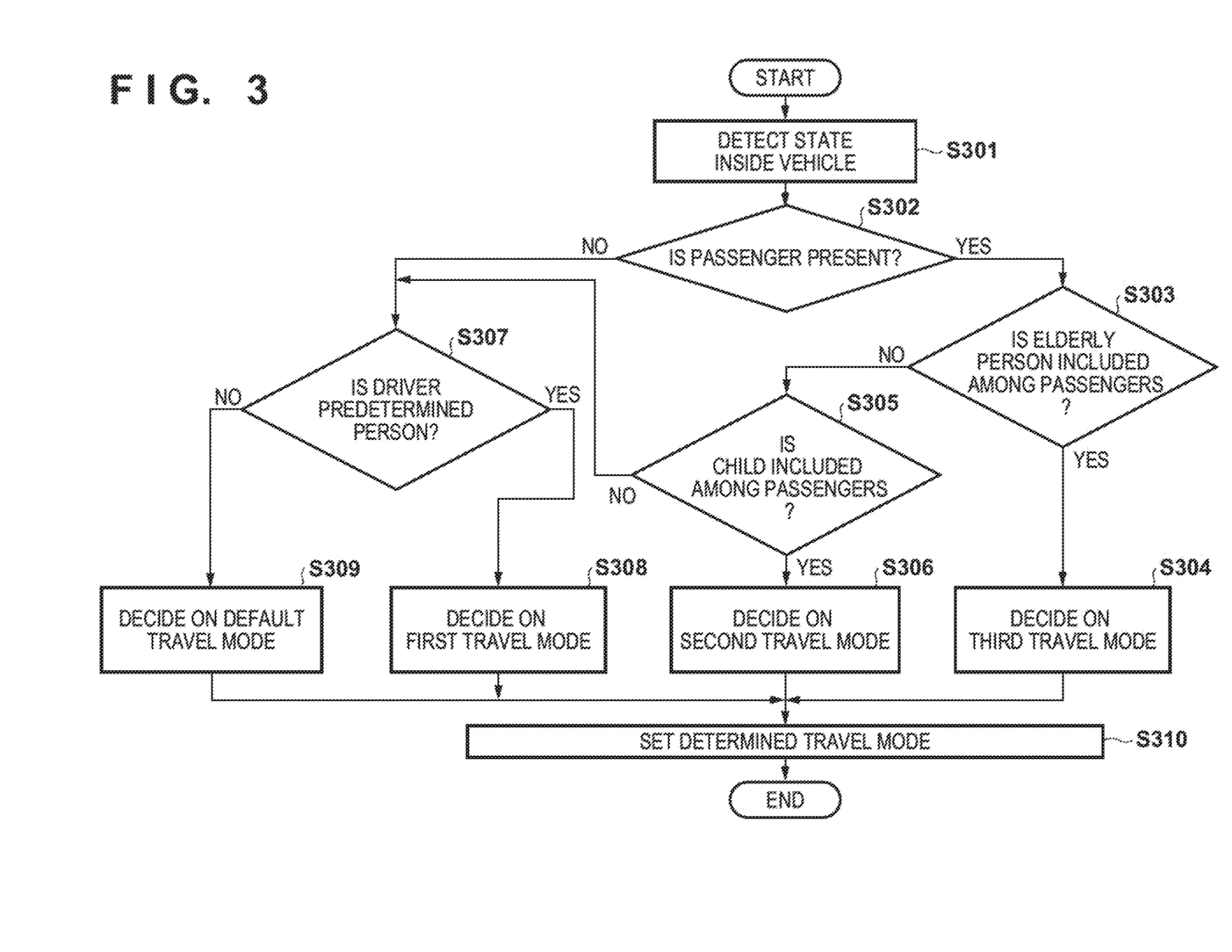
FIG. 3 is a flowchart of vehicle control processing according to the first embodiment.

The processing procedure of the control processing according to this embodiment will be described with reference to FIG. 3. Although the various kinds of ECUs and the like included in the vehicle 1 as described above will cooperate to perform processing in each control process of this processing procedure, the main entity of processing will be indicated as the control system 2 of the vehicle 1 for the sake of descriptive convenience here. This processing can be started when, for example, the vehicle 1 starts to travel.

In step S301, the control system 2 uses the in-vehicle detection unit 50 to detect the state inside the vehicle 1.

In step S302, the control system 2 determines whether a passenger is present in addition to the driver. For example, in a case in which a person other than a driver is sitting in a seat in the vehicle 1, the control system will determine that a passenger is present. If it is determined that a passenger is present (YES in step S302), the process advances to step S303. If it is determined that a passenger is not present (NO in step S302), the process advances to step S307.

In step S303, the control system 2 determines whether an elderly person is included among the passengers. Determination as to whether a passenger is an elderly person may be performed in this case by using, for example, a known method such as facial image pattern matching or the like, and the determination method is not particularly limited. If it is determined that an elderly person is included (YES in step S303), the process advances to step S304. If it is determined that an elderly person is not included (NO in step S303), the process advances to step S305.

In step S304, the third travel mode is decided as the travel mode during travel support control by the control system 2. Subsequently, the process advances to step S310.

In step S305, the control system 2 determines whether a child is included among the passengers. Determination as to whether a passenger is a child may be performed in this case by using, for example, a known method such as facial image pattern matching, body shape pattern matching, or the like, and the determination method is not particularly limited. If it is determined that a child is included (YES in step S305), the process advances to step S306. If it is determined that a child is not included (NO in step S305), the process advances to step S307.

In step S306, the second travel mode is decided as the travel mode during travel support control by the control system 2. Subsequently, the process advances to step S310.

In step S307, the control system 2 determines whether the driver is a predetermined person. Determination as to whether the driver is the predetermined person may be performed in this case by using, for example, a known method such as facial image pattern matching, which is performed by registering the facial image of the predetermined person (for example, the owner of the vehicle 1 or his/her family member), and the determination method is not particularly limited. If the driver is determined to be the predetermined person (YES in step S307), the process advances to step S308. If the driver is determined not to be the predetermined person (NO in step S307), the process advances to step S309.

In step S308, the first travel mode is decided as the travel mode during the travel support control by the control system 2. In this embodiment, a travel mode (the first travel mode in this case) and a person who has been registered as a predetermined person are associated with each other and held, and the travel mode is decided in response to the detection of the predetermined person. Subsequently, the process advances to step S310.

In step S309, the default travel mode is decided as the travel mode during the travel support control by the control system 2. As described above, the default travel mode is a travel mode set regardless of the occupant of the vehicle 1. Subsequently, the process advances to step S310.

In step S310, the control system 2 sets the various kinds of setting values and makes settings to restrict/cancel functions so that control will be performed by the travel mode determined during the driving support control process. Subsequently, the processing procedure ends.

As described above, according to this embodiment, when a driving support instruction is made and driving support control is performed, it is possible to execute and continue vehicle travel control in a safer manner in accordance with the occupant of the vehicle.

Note that although an elderly person and a child were exemplified in the above example, the present invention is not limited to this. For example, the travel mode may be switched by detecting a visual characteristic or a health state such as that of an injured person, a pregnant woman, or the like. In addition, the above-described arrangement is merely an example of how an occupant of each attribute is to be associated with a travel mode which uses a safer setting, and the combinations of these associations may be changed. Alternatively, pieces of attribute information such as the sex, whether the owner of the vehicle is present as the occupant, and the like may be used.

In addition, it may be arranged so that the registration of a predetermined person as described will be performed in the vehicle 1 or performed in an external device and the information of the predetermined person will be obtained via the communication device 24c.

Second Embodiment

An embodiment assuming a case in which the state of an occupant changes while the vehicle is traveling under driving support control will be described as the second embodiment of the present invention. Note that a description will be omitted for parts overlapping those of the first embodiment, and only the differences will be described.

Figure 4:
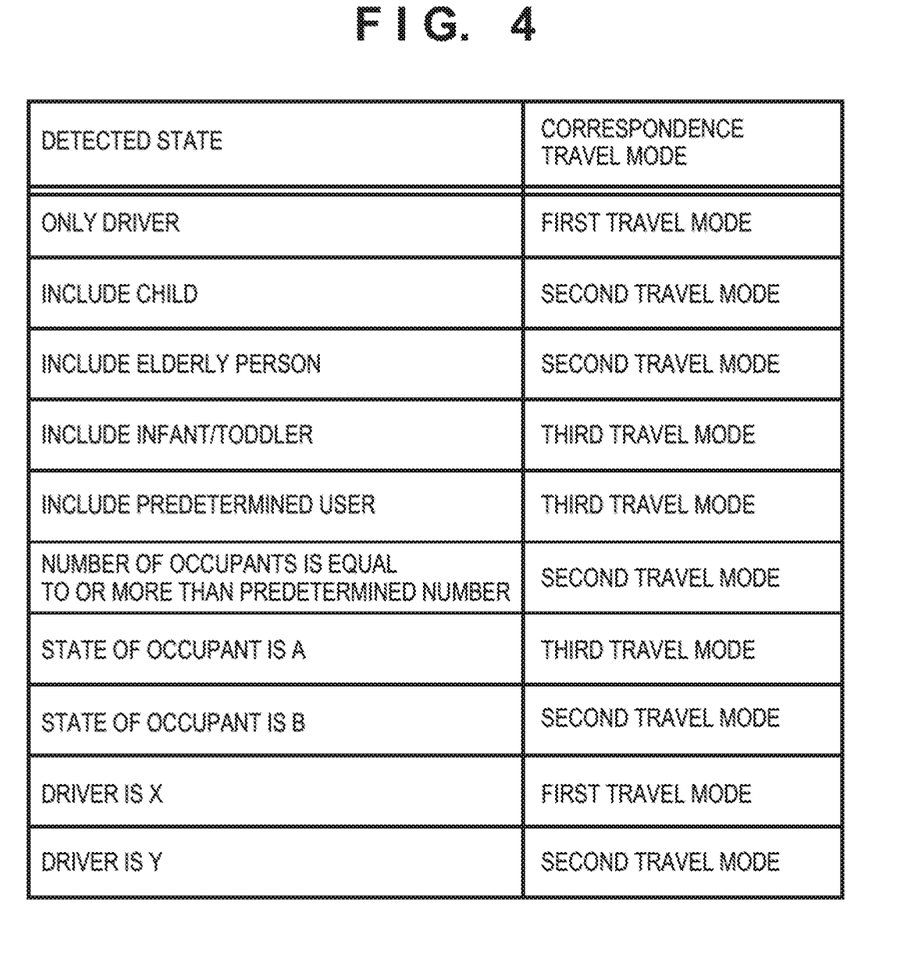
FIG. 4 is a table showing an example of the correspondence relationship between each detected state and each travel mode according to the second embodiment.

FIG. 4 is a table showing the correspondence relationship between each detected state and each travel mode according to this embodiment. Assume that each detected state is determined based on information detected by the various kinds of sensors in the vehicle 1. In addition, the detected states and the respective travel modes associated with the detected states exemplified here are merely an example, and other correspondence relationships may be set. The information of each correspondence relationship shown in FIG. 4 is held in a storage unit in a vehicle 1 and is read out as needed.

In FIG. 4, states in the vehicle 1 such as "only driver", "include child", "include elderly person", "include infant/toddler", "include predetermined user", and the like are shown as an example of detected states. Additionally, a case in which the number of occupants of the vehicle 1 is equal to or more than a predetermined number is included as a detected state. The predetermined number here may be decided based on the upper-limit number of occupants in the vehicle 1 or may be decided in accordance with the control function or the like of the vehicle 1. Furthermore, a case in which the state of an occupant is in a predetermined state (A or B) is included as a detected state. The predetermined state may be a state in which an occupant is injured, a state in which an occupant is unwell, or a state in which an occupant is asleep.

For example, in the vehicle 1, travel support control by the first travel mode is performed if a state in which only the driver is present is detected. The switching of each travel mode can be performed when the detected state has been changed or performed at a predetermined timing after a state has been detected.

[Processing Procedure]

Figure 5:
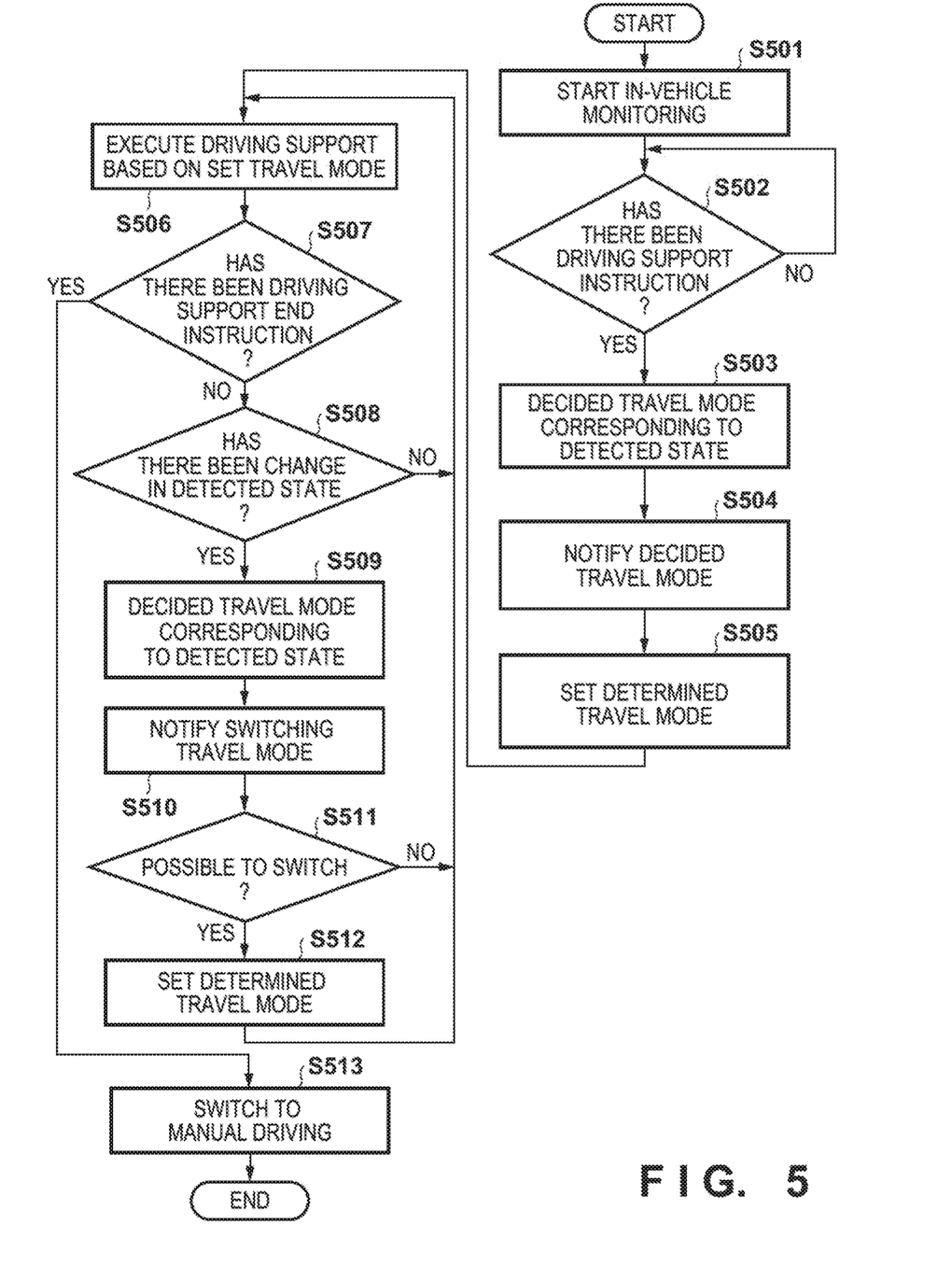
FIG. 5 is a flowchart of vehicle control processing according to the second embodiment.

The processing procedure of control processing according to this embodiment will be described with reference to FIG. 5. Although the various kinds of ECUs and the like included in the vehicle 1 as described above will cooperate to perform processing in each control process of this processing procedure, the main entity of processing will be indicated as a control system 2 of the vehicle 1 for the sake of descriptive convenience here. This processing can be started when, for example, the vehicle 1 starts to travel. Assume that the starting point of this processing is set to a state controlled by manual operation. In addition, the detection and determination methods of occupants of the vehicle 1 are similar to those of the first embodiment.

In step S501, the control system 2 starts the in-vehicle monitoring operation of the vehicle 1. In this embodiment, an in-vehicle detection unit 50 is used to detect each occupant in the vehicle. The detection here may be performed at a predetermined interval or may be performed when a predetermined event (for example, a temporarily stop of the vehicle 1 or the opening/closing of a door) has occurred.

In step S502, the control system 2 determines whether a driving support instruction has been accepted from an occupant. The instruction here may be made via an operation unit such as a touch panel or the like provided in the vehicle 1 or via an operation unit (a button or a lever) related to driving. If it is determined that the driving instruction has been accepted (YES in step S502), the process advances to step S503. If it is determined that the driving instruction has not been accepted (NO in step S502), the state of control by manual operation is continued.

In step S503, as a result of the in-vehicle monitoring operation, the control system 2 decides a travel mode corresponding to the detected state. As shown in FIG. 4, a travel mode corresponding to each detected state has been defined in advance, and the travel mode is decided based on this information.

In step S504, the control system 2 notifies the occupant of the vehicle 1 of the travel mode decided in step S503. The notification method in this case may be performed, for example, by voice or by displaying on a display or the like. Note that when notification of the decided travel mode is to be performed, in may be arranged so that whether to permit the travel mode can be accepted by the occupant. For example, if the occupant make an instruction not to permit the decided travel mode when the occupant has been notified of the decided travel mode, the occupant may be presented with an alternative travel mode. In this case, the travel mode may be the default travel mode or a travel mode that has been decided again based on conditions different from the travel mode which was decided previously.

In step S505, the control system 2 makes various kinds of settings so that control will be performed under the travel mode decided in step S503. For example, as shown in FIG. 2, if a different threshold is to be used as the threshold related to the control corresponding to travel mode, the corresponding threshold will be set. Also, in a case in which the executable functions are to be changed in correspondence with the travel mode, a restriction corresponding to each function will be set.

In step S506, the control system 2 starts and executes the driving support based on the set travel mode.

In step S507, the control system 2 determines whether it has accepted a driving support end instruction from the occupant. The instruction here may be performed via an operation unit (not shown) such as a touch panel display or the like provided in the vehicle 1 or may be performed via an operation unit (a button or a lever) related to driving. If it is determined that a driving support end instruction has been accepted (YES in step S507), the process advances to step S513. If it is determined that the driving support end instruction has not been accepted (NO in step S507), the process advances to step S508.

In step S508, the control system 2 determines whether there has been a change in the detected state during the vehicle monitoring operation. For example, changes such as a state in which a person on board has become unwell and is asleep may be detected. Such changes can be determined by performing a comparison based on information held in advance and information such as an image or the like obtained by the in-vehicle detection unit 50. Alternatively, in response to detecting that a state of no movement has continued for a predetermined time, the control system may determine that the person on board is in a predetermined state (for example, asleep or in a coma). Alternatively, for example, information of the state a predetermined time before the current state may be held, and a detection may be performed based on the difference from this information. For example, it may additionally detect how the detected state has changed (the transition of the state change). If it is determined that there has been a change in the detected state (YES in step S508), the process advances to step S509. If it is determined that there has been no change in the detected state (NO in step S508), the process returns to step S506, and the driving support control is continued.

In step S509, as a result of the in-vehicle monitoring operation, the control system 2 decides the travel mode corresponding to the detected state. The decision method here is similar to the process performed in step S503. Note that if the transition of the state change is determined in step S508, the travel mode may be decided in accordance with the transition.

In step S510, the control system 2 notifies each occupant of the vehicle 1 that the travel mode of the vehicle 1 will be switched based on the change in the detected state. The notification method here may be performed, for example, by voice or by displaying on a display.

In step S511, the control system 2 accepts an instruction to permit/reject the travel mode switching from the occupant. The acceptance method here may be performed by, for example, voice or via an operation unit (not shown) such as a touch panel display. For example, the occupant may reject the switching of the travel mode if he/she desires to continue traveling by the current travel mode. For example, assume a case in which the occupant is notified (presented) that the travel mode will be switched to a travel mode of lower speed control because the control system has detected that another occupant has become unwell. In such a state, the occupant may reject the switching of the travel mode if he/she desires to quickly go home or the like. If it is determined that the switching has been enabled (YES in step S511), the process advances to step S512. If it is determined that the switching has been disabled (NO in step S511), the process returns to step S506, and driving support control by the current travel mode is continued.

In step S512, the control system 2 makes various settings so that control will be performed under the travel mode decided in step S509. The settings can be made in a similar manner to step S505. Subsequently, the process returns to step S506, and driving support control is performed under the switched travel mode.

In step S513, the control system 2 switches to manual driving. In this switching operation, for example, processing to prompt the occupant to monitor the periphery and to grip the steering wheel is performed. A known method can be used for this operation and is not particularly limited. Subsequently, the processing procedure ends.

As described above, in addition to the effects of the first embodiment, it is possible to execute vehicle travel control more safely in accordance with the change in the state of occupants of the vehicle.

Note that in the above processing procedure described above, travel mode switching was performed in the state of driving support control. However, the present invention is not limited to this. For example, if the driving support control has a plurality of levels, a plurality of travel modes may be defined for each level, and the travel mode may be switched at each level.

Also, although the above processing procedure showed an example in which the occupant is requested to make a confirmation when travel mode switching is to be performed, it may be arranged so that a confirmation will not be requested.

In addition, although an example in which the association between the travel modes and the detected states are defined in advance has been described above, the present invention is not limited to this. For example, it may be arranged so that the user can set a travel mode corresponding to the detected state via a user interface (not shown). More specifically, as described in the first embodiment, it may be arranged so that a predetermined person (user) can be registered and a predetermined travel mode can be prioritized and set when this predetermined person is on board.

Also, although the example of FIG. 4 showed the detected states in an equal manner, a degree of priority may be set for each detected state. For example, if a state A and a state B are both detected in a case in which the detection of these states has been enabled, it may be arranged so that the travel mode associated with the state A will be prioritized and decided.

In addition, the above example showed an example in which the travel mode is decided in accordance with the attribute or the state of each occupant of the vehicle 1 and a combination of these conditions. However, the present invention is not limited to this arrangement, and the travel mode may be decided by combining further information. For example, the setting information about the destination and information (peripheral information) about the external environment obtained by each detection unit may be combined. More specifically, in a case in which it is detected that an occupant is unwell and a hospital is set as the destination, it may be set so that the control system will decide to use a travel mode which offers a safer driving support. Alternatively, it may be set so that the control system will decide to use a travel mode which offers a safer driving support in also a case in which Y is the driver and the road is wet. Additionally, in a case in which passengers are present, the information of the number of occupants, the positional relationships (seating positions) of the occupants, and the like may be used. Also, in a case in which a plurality of occupants are present, the information of the relationship (combination) of the occupants may be used.

Furthermore, the above example showed an example in which the travel mode is decided in accordance with the state or the attribute of an occupant of the vehicle 1. It may also be arranged so that the travel mode and a threshold set at the time of travel will be decided in accordance with an onboard position (the seat or the like) of the occupant. For example, in a case in which an occupant is present in the back seat, it may be arranged so that the vehicle-to-vehicle distance will be increased. In addition, in a case in which an occupant is sitting in either the left seat or the right seat, it may be arranged so that the threshold will be changed when a lane change operation is to be performed on the side where the occupant is sitting.

Summary of Embodiment

1. A vehicle control system according to the above-described embodiment is a control system (for example, 2) of a vehicle (for example, 1) that can travel by a plurality of travel modes which have different control operations from each other at the time of driving support control, comprising:

detection means (for example, 50) for detecting an occupant or a plurality of occupants of the vehicle;

decision means (for example, 2) for deciding, among the plurality of travel modes, a travel mode corresponding to an attribute of the occupant and/or a combination of occupants detected by the detection means; and control means (for example, 2) for controlling travel of the vehicle by the travel mode decided by the decision means.

According to this embodiment, it is possible to execute driving support control corresponding to the attribute of an occupant and/or a combination of occupants of the vehicle.

2. In the above-described embodiment, the detection means detects one of a state and the presence/absence of a passenger.

According to this embodiment, driving support control corresponding to the attribute or the state of the occupant of the vehicle can be executed.

3. In the above-described embodiment, the plurality of travel modes include a first travel mode and a second travel mode in which a driving support control function is restricted more than the first travel mode, and the decision means decides to use the second travel mode when the detection means detects one of an occupant of a predetermined attribute and an occupant of a predetermined state.

According to this embodiment, it is possible to provide a high level of safety driving support control with more restricted functions in a case in which an occupant of a predetermined attribute or a predetermined state is on board the vehicle.

4. In the above-described embodiment, a threshold of driving support control used in each of the plurality of travel modes is a threshold of one of a number of lane change operations, a distance from a preceding vehicle, a speed of travel, and deceleration/acceleration rate.

According to this embodiment, it is possible to control the number of lane change operations, the distance from the preceding vehicle, or the acceleration/deceleration rate in correspondence with the occupant at the time of driving support control.

5. In the above-described embodiment, the occupant of the predetermined attribute is determined based on at least one of an owner of the vehicle, age, sex, and a health state.

According to this embodiment, safer driving support control can be provided in a case in which an occupant of a predetermined attribute is onboard the vehicle.

6. In the above-described embodiment, the occupant of the predetermined state is an occupant in a state of no movement.

According to this embodiment, safer driving support control can be provided in a case in which an occupant who is asleep is present.

7. In the above-described embodiment, a predetermined user and one of the plurality of travel modes are associated with each other and registered, and the decision means decides to use the travel mode associated with the predetermined user in a case in which the detection means detects that the predetermined user is on board.

According to this embodiment, safer driving support control can be provided in a case in which a preregistered user is onboard the vehicle.

8. In the above-described embodiment, the decision means further decides the travel mode in accordance with an onboard position of the occupant in the vehicle.

According to this embodiment, driving support control corresponding to the onboard position of the occupant can be provided.

9. In the above-described embodiment, the decision means further decides the travel mode by using one of destination information and peripheral information of the vehicle.

According to this embodiment, driving support control corresponding to the peripheral information and the destination information can be provided in addition to the detection result of the occupant.

10. In the above-described embodiment, a degree of priority is set to a state which can be detected by the detection means, and in a case in which a plurality of states are detected by the detection means, the decision means decides the travel mode based on the degree of priority.

According to this embodiment, it is possible to set a travel mode to be prioritized and applied in a case in which a plurality of states related to the occupant are detected so that appropriate travel support control can be provided.

11. A vehicle control system according to the above-described embodiment is a control system (for example, 2) of a vehicle (for example, 1) that can travel by a plurality of travel modes which have different control operations from each other at the time of driving support control, comprising:

detection means (for example, 50) for detecting an occupant or a plurality of occupants of the vehicle;

decision means (for example, 2) for deciding, among the plurality of travel modes, a travel mode corresponding to an attribute of the occupant detected by the detection means; and control means (for example, 2) for controlling travel of the vehicle by the travel mode decided by the decision means, wherein in a case in which the detection means has detected the plurality of occupants, the decision means decides a travel mode corresponding to an attribute with a highest degree of priority among the attributes of the plurality of occupants.

According to this embodiment, it is possible to execute driving support control based on an attribute with a high degree of priority among the attributes of the plurality of occupants of the vehicle.

12. A control method of a vehicle according to the above-described. embodiment is a control method of a vehicle (for example, 1) that can travel by a plurality of travel modes which have different control operations from each other at the time of driving support control, the method comprising:

a detection step of detecting an occupant or a plurality of occupants of the vehicle;

a decision step of deciding, among the plurality of travel modes, a travel mode corresponding to an attribute of the occupant detected in the detection step; and a control step of controlling travel of the vehicle by the travel mode decided in the decision step.

According to this embodiment, it is possible to execute driving support control corresponding to the attribute of an occupant and/or a combination of occupants of the vehicle.

13. A control method of a vehicle according to the above-described embodiment is a control method of a vehicle (for example, 1) that can travel by a plurality of travel modes which have different control operations from each other at the time of driving support control, the method comprising:

a detection step of detecting an occupant or a plurality of occupants of the vehicle;

a decision step of deciding, among the plurality of travel modes, a travel mode corresponding to an attribute of the occupant detected in the detection step; and a control step of controlling travel of the vehicle by the travel mode decided in the decision step, wherein in a case in which the plurality of occupants is detected in the detection step, a travel mode corresponding to an attribute with a highest degree of priority among the attributes of the plurality of occupants is decided in the decision step.

According to this embodiment, it is possible to execute driving support control based on an attribute with a high degree of priority among the attributes of the plurality of occupants of the vehicle.

14. A non-transitory computer-readable medium storing a program according to the embodiment described above causes a computer (for example, 2), which is incorporated in a vehicle (for example, 1) that can travel by a plurality of travel modes which have different control operations from each other at the time of driving support control, to function as obtainment means (for example, 2) for obtaining information of an occupant or a plurality of occupants of the vehicle from detection means (for example, 50);

decision means (for example, 2) for deciding, among the plurality of travel modes, a travel mode corresponding to an attribute of the occupant and/or a combination of occupants specified by the information obtained by the obtainment means; and control means (for example, 2) for controlling travel of the vehicle by the travel mode decided by the decision means.

According to this embodiment, it is possible to execute driving support control corresponding to the attribute of an occupant and/or a combination of occupants of the vehicle.

15. A non-transitory computer-readable medium storing a program according to the embodiment described above causes a computer (for example, 2), which is incorporated in a vehicle (for example, 1) that can travel by a plurality of travel modes which have different control operations from each other at the time of driving support control, to function as obtainment means (for example, 2) for obtaining information of an occupant or a plurality of occupants of the vehicle from detection means (for example, 50);

decision means (for example, 2) for deciding, among the plurality of travel modes, a travel mode corresponding to an attribute of the occupant specified by the information of the occupant obtained by the obtainment means; and control means (for example, 2) for controlling travel of the vehicle by the travel mode decided by the decision means, wherein in a case in which the detection means has detected the plurality of occupants, the decision means decides a travel mode corresponding to an attribute with a highest degree of priority among the attributes of the plurality of occupants.

According to this embodiment, it is possible to execute driving support control based on an attribute with a high degree of priority among the attributes of the plurality of occupants of the vehicle.

The invention is not limited to the foregoing embodiments, and various variations/changes are possible within the spirit of the invention.

What is claimed is:

1. A control system of a vehicle that can travel by a plurality of travel modes which have different control operations from each other at the time of driving support control, comprising:

a detection unit configured to detect an occupant or a plurality of occupants of the vehicle;

a decision unit configured to decide, among the plurality of travel modes, a travel mode based on a detection result of the detection unit; and a control unit configured to control travel of the vehicle by the travel mode decided by the decision unit, wherein the plurality of travel modes includes a first travel mode, a second travel mode and a third travel mode, in the third travel mode, a distance from a preceding vehicle in an adaptive cruise control is controlled not less than a first threshold, in the second travel mode, a distance from a preceding vehicle in the adaptive cruise control is controlled not less than a second threshold which is shorter than the first threshold, in the first travel mode, a distance from a preceding vehicle in the adaptive cruise control is not limited, the decision unit is configured to decide the third travel mode when the detection result indicates a toddler, the decision unit is configured to decide the second travel mode when the detection result indicates an elderly person, and the decision unit is configured to decide the first travel mode when the detection result indicates only a driver.

2. The control system according to claim 1, wherein the decision unit further decides the travel mode in accordance with an onboard position of the occupant in the vehicle.

3. The control system according to claim 1, wherein the decision unit further decides the travel mode by using one of destination information and peripheral information of the vehicle.

4. The control system according to claim 1, wherein in a case in which the detection unit has detected the plurality of occupants, the decision unit decides a travel mode corresponding to an attribute with a highest degree of priority among the attributes of the plurality of occupants.

5. The control system according to claim 1, wherein in the third mode, a lane change operation is not permitted, in the second travel mode, the lane change operation is permitted but a consecutive number of lane change operations are restricted, and in the first travel mode, the lane change is permitted and a consecutive number of lane change operations are not restricted.

6. The control system according to claim 1, wherein the decision unit is configured to decide the second travel mode when the detection result indicates a plurality of occupants.

7. A control method of a vehicle that can travel by a plurality of travel modes which have different control operations from each other at the time of driving support control, the method comprising:

detecting an occupant or a plurality of occupants of the vehicle;

deciding, among the plurality of travel modes, a travel mode based on a detection result detected in the detecting;

controlling travel of the vehicle by the travel mode decided in the deciding, wherein the plurality of travel modes includes a first travel mode, a second travel mode and a third travel mode, in the third travel mode, a distance from a preceding vehicle in an adaptive cruise control is controlled not less than a first threshold, in the second travel mode, a distance from a preceding vehicle in the adaptive cruise control is controlled not less than a second threshold which is shorter than the first threshold, in the first travel mode, a distance from a preceding vehicle in the adaptive cruise control is not limited, and in the deciding:

the third travel mode is decided when the detection result indicates a toddler;

the second travel mode is decided when the detection result indicates an elderly person; and the first travel mode is decided when the detection result indicates only a driver.

8. A control method according to claim 7, wherein in a case in which the plurality of occupants is detected in the detecting, a travel mode corresponding to an attribute with a highest degree of priority among the attributes of the plurality of occupants is decided in the deciding.

9. A non-transitory computer-readable storage medium storing a program to cause a computer, which is incorporated in a vehicle that can travel by a plurality of travel modes which have different control operations from each other at the time of driving support control, to function as an obtainment unit configured to obtain information of an occupant or a plurality of occupants of the vehicle from a detection unit;

a decision unit configured to decide, among the plurality of travel modes, a travel mode based on the information obtained by the obtainment unit; and a control unit configured to control travel of the vehicle by the travel mode decided by the decision unit, wherein the plurality of travel modes includes a first travel mode, a second travel mode and a third travel mode, in the third travel mode, a distance from a preceding vehicle in an adaptive cruise control is controlled not less than a first threshold, in the second travel mode, a distance from a preceding vehicle in the adaptive cruise control is controlled not less than a second threshold which is shorter than the first threshold, in the first travel mode, a distance from a preceding vehicle in the adaptive cruise control is not limited, the decision unit is configured to decide the third travel mode when the detection result indicates a toddler, the decision unit is configured to decide the second travel mode when the detection result indicates an elderly person, and the decision unit is configured to decide the first travel mode when the detection result indicates only a driver.

10. The non-transitory computer-readable storage medium according to claim 9, wherein in a case in which the information indicates the plurality of occupants, the decision unit decides a travel mode corresponding to an attribute with a highest degree of priority among the attributes of the plurality of occupants.

\* \* \* \* \*